(No Model.)

G. W. ROWELL.
HAY TEDDER FORK.

No. 436,152. Patented Sept. 9, 1890.

Witnesses
Geo. W. Young
Jno. L. Condon

Inventor
George W. Rowell
By H. G. Underwood
Attorney

UNITED STATES PATENT OFFICE.

GEORGE W. ROWELL, OF MENOMONEE FALLS, WISCONSIN, ASSIGNOR TO I. B. ROWELL & CO., OF SAME PLACE.

HAY-TEDDER FORK.

SPECIFICATION forming part of Letters Patent No. 436,152, dated September 9, 1890.

Application filed May 17, 1890. Serial No. 352,225. (No model.)

*To all whom it may concern:*

Be it known that I, GEORGE W. ROWELL, of Menomonee Falls, in the county of Waukesha, and in the State of Wisconsin, have invented certain new and useful Improvements in Hay-Tedder Forks; and I do hereby declare that the following is a full, clear and exact description thereof.

My invention relates to the forks of hay-tedders and similar agricultural machines; and the invention consists in certain peculiar and novel features of construction and arrangement, as hereinafter described, and pointed out in the appended claims.

In order that my invention may be fully understood, I will proceed to describe it with reference to the accompanying drawings, in which—

Figure 2:
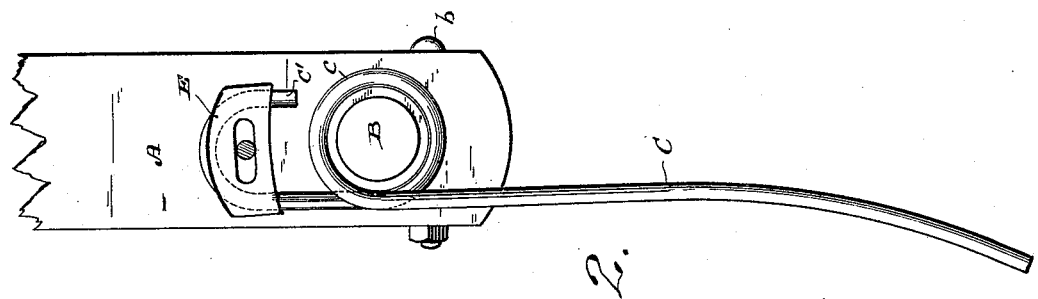
Figure 3:
Figure 1:
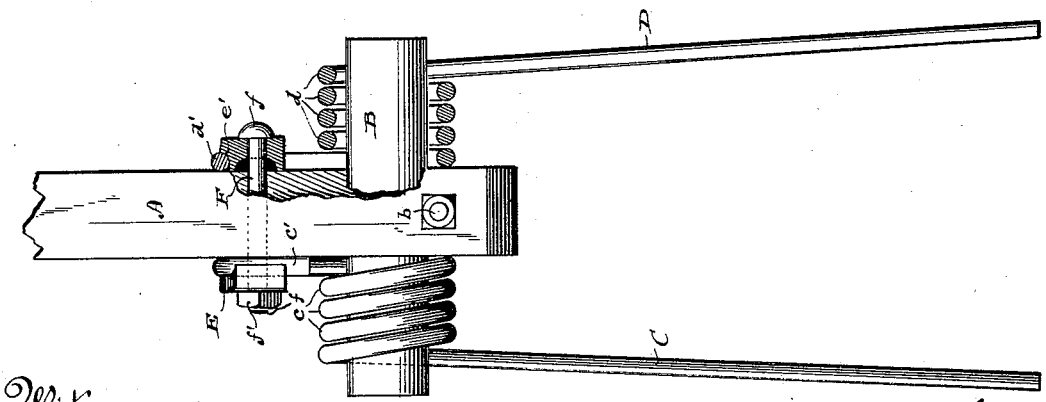

Figure 1 is a rear elevation of my improved hay-tedder fork. Fig. 2 is a side elevation of the same, and Fig. 3 is a detached view of one of the socket-plates.

The objects of my invention are to produce a hay-tedder fork the tines of which shall be separately and independently adjustable, so as to be readily varied in stiffnesss or tension to accord with different conditions of temper, as well as varying conditions of the grass or hay upon which the fork is to operate. These results I attain by virtue of the construction which I will now proceed to describe.

In the said drawings, A designates one of the staffs or bars which are usually journaled upon a crank-shaft of the machine, and otherwise operatively connected therewith in such manner as to exert a rearward-tossing action upon the hay or grass, the precise manner of mounting said staff being immaterial to the essential spirit of my invention.

B designates a pin, which is inserted transversely through the lower part of the staff or bar A so as to protrude at opposite sides thereof, as shown in Fig. 1. It will be obvious from the ensuing description that two oppositely-extending studs may be employed, if desired, in lieu of the through-pin B; but when this pin is used it is retained in position by a key-bolt $b$, passing through the staff and impinging against one side of the pin, or by other equivalent means.

C D designate the tines of the fork, each of which is of stout resilient metal, and the upper parts $c$ $d$ of which are turned in spiral form, as shown, to impart additional strength and springiness to the tines, so that the tines may yield and yet not be broken in the event of striking a stone or other obstruction. The protruding ends of the pin B are surrounded by these spirals, and thus afford effective bearings for the tines. The upper ends $c'$ $d'$ of these tines are bent into inverted-U form, for a purpose to be presently described.

E E designate two socket-plates, each of which is formed with a central slot or elongated opening $e$, and also upon its reverse side with a U-shaped socket or groove $e'$. A bolt F extends transversely through the lower part of the staff A above the pin B, and also through the slots $e$ of plates E, so that one of said plates is retained at one side of the staff by the bolt-head F, and the other plate is retained on the opposite side of the staff by the nut $f'$ of said bolt. The upper ends $c'$ $d'$ of the tines lie within the grooves or sockets of the plates E, and are thus confined between said plates and the opposite sides of the staff. From this description it will be seen that the tines are firmly secured to the staff, and that when either tine, or both, is to be adjusted so as to bring its lower end rearward or forward, it is only necessary to loosen the nut $f'$ and move the plates E in one direction or the other, (the slots $e$ permitting these movements,) and subsequently tighten up said nut $f'$. The arrangement is both simple and easily manipulated, and also very efficient in its work.

Having thus described my invention, what I claim as new therein, and desire to secure by Letters Patent, is—

1. An improved appliance for securing the tines of tedder-forks, consisting of an elongated plate having a central longitudinal elongated slot or opening to receive an attaching-bolt, and upon its reverse side an inverted-U-shaped socket to receive the U-shaped upper end of the tine and partially encircling said slot, substantially as set forth.

2. The combination, with the tedder-fork staff having oppositely-protruding bearings on its lower part, of separate tines having each a spiral portion surrounding one of said bearings, and a U-shaped upper end, a pair of socket-plates located at opposite sides of the staff and having each a central slot, and on its reverse side a U-shaped socket, and a bolt extending through the staff and also through the slots of the plates and serving to retain the plates and tines, substantially as described.

In testimony that I claim the foregoing I have hereunto set my hand, at Milwaukee, in the county of Milwaukee and State of Wisconsin, in the presence of two witnesses.

GEORGE W. ROWELL.

Witnesses:
H. G. UNDERWOOD,
W. T. CAMP.